US010512325B2

(12) United States Patent
Mitchell (10) Patent No.: US 10,512,325 B2
(45) Date of Patent: Dec. 24, 2019

(54) ADJUSTMENT MECHANISM FOR OVER-DOOR HANGING SYSTEM AND METHOD OF USE

(71) Applicant: April M. Mitchell, Oceanside, CA (US)

(72) Inventor: April M. Mitchell, Oceanside, CA (US)

( * ) Notice: Subject to any disclaimer, the term of this patent is extended or adjusted under 35 U.S.C. 154(b) by 0 days.

(21) Appl. No.: 15/986,330

(22) Filed: May 22, 2018

(65) Prior Publication Data

US 2018/0338609 A1 Nov. 29, 2018

Related U.S. Application Data

(60) Provisional application No. 62/509,854, filed on May 23, 2017.

(51) Int. Cl.
*A47B 45/00* (2006.01)
*A47B 95/00* (2006.01)
*A47G 29/00* (2006.01)
*F16B 7/10* (2006.01)
*F16B 45/00* (2006.01)

(52) U.S. Cl.
CPC ............. *A47B 45/00* (2013.01); *A47B 95/00* (2013.01); *A47G 29/00* (2013.01); *F16B 7/105* (2013.01); *F16B 45/00* (2013.01)

(58) Field of Classification Search
CPC ......... A47B 45/00; A47B 95/00; F16B 7/105; F16B 45/00; A47G 29/00
See application file for complete search history.

(56) References Cited

U.S. PATENT DOCUMENTS

| | | | | |
|---|---|---|---|---|
| 957,324 | A * | 5/1910 | Gall | A47B 43/006 108/147.21 |
| 972,579 | A * | 10/1910 | Shepard | A47G 1/16 248/496 |
| 2,270,796 | A * | 1/1942 | Hauser | A47G 25/08 211/119.004 |
| 3,829,113 | A * | 8/1974 | Epelbaum | B60N 2/2839 280/30 |
| 5,485,932 | A * | 1/1996 | Romm | A47B 57/50 211/103 |
| 5,645,178 | A * | 7/1997 | Conley, Jr. | A47F 5/08 211/87.01 |
| 6,003,825 | A * | 12/1999 | Abernathy, Jr. | A47G 1/164 248/478 |
| D466,396 | S | 12/2002 | Snell | |
| D470,394 | S | 2/2003 | Harwanko | |

(Continued)

*Primary Examiner* — Ko H Chan
(74) *Attorney, Agent, or Firm* — Law Office of Mark Brown, LLC; Christopher M. DeBacker (57) ABSTRACT

A storage management system having a crossbar and pair of vertical arms which are hung by flat hooks over a door. A pair of slides can slide up and down the vertical arms and are secured using an adjustment mechanism. These slides can provide storage solutions to a side of a door, freeing up other space for additional uses. Such storage solutions may include hooks, baskets, bags, or other storage elements. The adjustment mechanism may include a spring for being pulled out and automatically springing back into a number of adjustment slots along the slides. Alternatively, the adjustment mechanism could simply be screwed into the desired slot, locking the slide in place.

11 Claims, 12 Drawing Sheets

(56) References Cited

U.S. PATENT DOCUMENTS

| | | | |
|---|---|---|---|
| 6,575,416 B1 | 6/2003 | Avinger | |
| D479,796 S | 9/2003 | Snell | |
| 6,857,608 B2 | 2/2005 | Avinger | |
| 7,204,569 B2 | 4/2007 | Walburn | |
| D542,065 S | 5/2007 | Snell | |
| 7,234,671 B2 | 6/2007 | Avinger | |
| D579,247 S | 10/2008 | Heroux | |
| D651,030 S | 12/2011 | Heroux | |
| 8,091,844 B1* | 1/2012 | Bragg | F24F 13/32 |
| | | | 248/208 |
| 8,636,156 B2 | 1/2014 | Malik | |
| 9,163,854 B2* | 10/2015 | Arbucci | E06B 7/28 |
| 9,480,350 B2 | 11/2016 | Kressin et al. | |
| 9,736,992 B1* | 8/2017 | Barry | A01G 5/04 |
| 2003/0137832 A1* | 7/2003 | Little | A47G 7/045 |
| | | | 362/183 |

* cited by examiner

ADJUSTMENT MECHANISM FOR OVER-DOOR HANGING SYSTEM AND METHOD OF USE

CROSS-REFERENCE TO RELATED APPLICATION

This application claims priority in U.S. Provisional Patent Application No. 62/509,854 Filed May 23, 2017, and in U.S. Provisional Patent Application No. 62/625,498 Filed Feb. 2, 2018, both of which are incorporated herein by reference.

BACKGROUND OF THE INVENTION

1. Field of the Invention

The present invention relates generally to an item hanging system and method for use thereof, and more specifically to an adjustment mechanism and its use with an over-door mounted hanging system with adjustable hooks.

2. Description of the Related Art

Storage solutions are a widely sought after commodity, especially in rooms or homes with limited storage space. Some storage solutions are necessary for specific items, while others simply open up areas for storage which previously provided no storage at all.

Heretofore there has not been available a system or method for an over-door hanging system with the advantages and features of the present invention.

BRIEF SUMMARY OF THE INVENTION

The present invention generally provides an over-door hanging system with a pair of adjustable hanging hooks. A cross bar with a pair of squared hooks engages with the top of a door, the hooks being thin enough to allow the door to be shut while the hooks are engaged with the top of the door.

A pair of vertical arms extend down from either end of the cross bar. Each arm has a plurality of mounting holes for receiving a mounting pin which is connected to the pair of adjustable hanging hooks. Each of the adjustable hanging hooks has at least one hook element, but preferably has two or more.

Each hanging hook can be adjusted vertically separate from the other hanging hook. The mounting pin can be spring-mounted to the adjustable hanging hooks or may screw into and out of the hanging hooks, thereby engaging with one of the mounting holes of the vertical arms.

An alternative embodiment employs the adjustable sliders along a bracket for other organizational purposes, such as for hooks, organizers, baskets, storage containers, adjustable shelves, or any other suitable purpose. The grippable handle can be pulled out or unscrewed from a slot within a bracket, allowing a slider to slide along the bracket, where the handle can then be inserted into another slot, locking the slider into place along the bracket.

BRIEF DESCRIPTION OF THE DRAWINGS

The drawings constitute a part of this specification and include exemplary embodiments of the present invention illustrating various objects and features thereof.

DETAILED DESCRIPTION OF THE PREFERRED EMBODIMENTS

I. Introduction and Environment

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Forwardly and rearwardly are generally in reference to the direction of travel, if appropriate. Said terminology will include the words specifically mentioned, derivatives thereof and words of similar meaning.

II. Preferred Embodiment Over-Door Hanging System 2

As shown in FIGS. 1-6, the present invention is an over-door hanging system 2. It includes a horizontal crossbar member 4 with two flat hooks 10 for hooking over and engaging the top edge of a door. The flat hooks 10 should be thin enough to allow the door to close while the flat hooks remain engaged with the door.

A pair of vertical arms 6 extend down from the horizontal crossbar. These arms include several mounting holes 12 for receiving mounting pins 16 which connect a pair of slides 8, each having hooks 14, onto the arms 6. Each arm includes at least one sliding hook, and could contain more. The hooks could be separate or connected as shown in the figures. The mounting pin 16 could be unscrewed to disengage and screwed back in to reengage with the mounting holes, or could be connected with a spring connection or other mounting means.

The length of the vertical arms could be of any suitable length to allow the hooks to be adjusted vertically. There could be any number of hooks. The figures show a hook element on each vertical arm, each having two hooks. However, each could have one or more hooks as desired.

III. Alternative Embodiment Adjustment Mechanism System 102

FIGS. 7-10 show an alternative embodiment adjustment mechanism system 102 which does not rely on the hooks of the previous embodiment. The adjustment device used with the first embodiment over-door hanging system above could be used for many other applications, especially for house organization and storage applications. The adjustment element includes a grippable handle 116 which can be pulled or unscrewed to be removed from a first slot, allowing a slider 108 to be raised or lowered along a bracket, and then the handle can be screwed or inserted into a second one of the slots 112 to lock the slider into place. This could be used to hold hooks, organizers, baskets, storage containers, adjustable shelves, or any other suitable purpose.

The embodiment adjustment mechanism system 102 could also employ a crossbar 104 with flat hooks 110 such as the previous embodiment; however, a single arm 106 with a single flat hook 110 could also be useful with the adjustment mechanism system 102.

Figure 1:
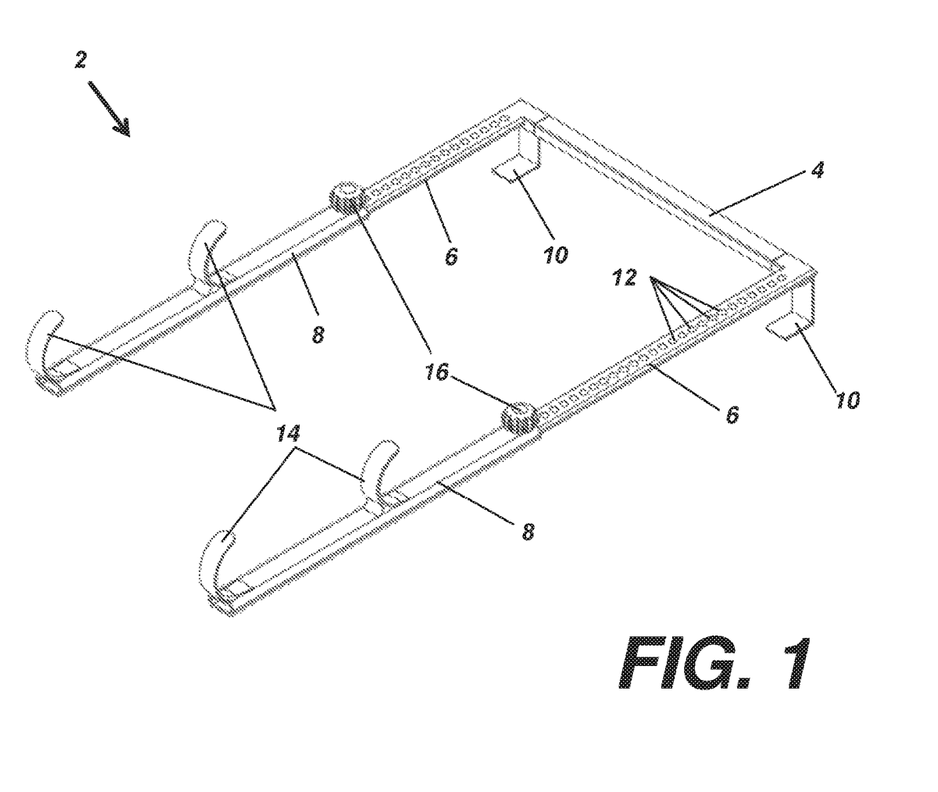
FIG. 1 is a three-dimensional isometric view of a preferred embodiment of the present invention.
Figure 2:
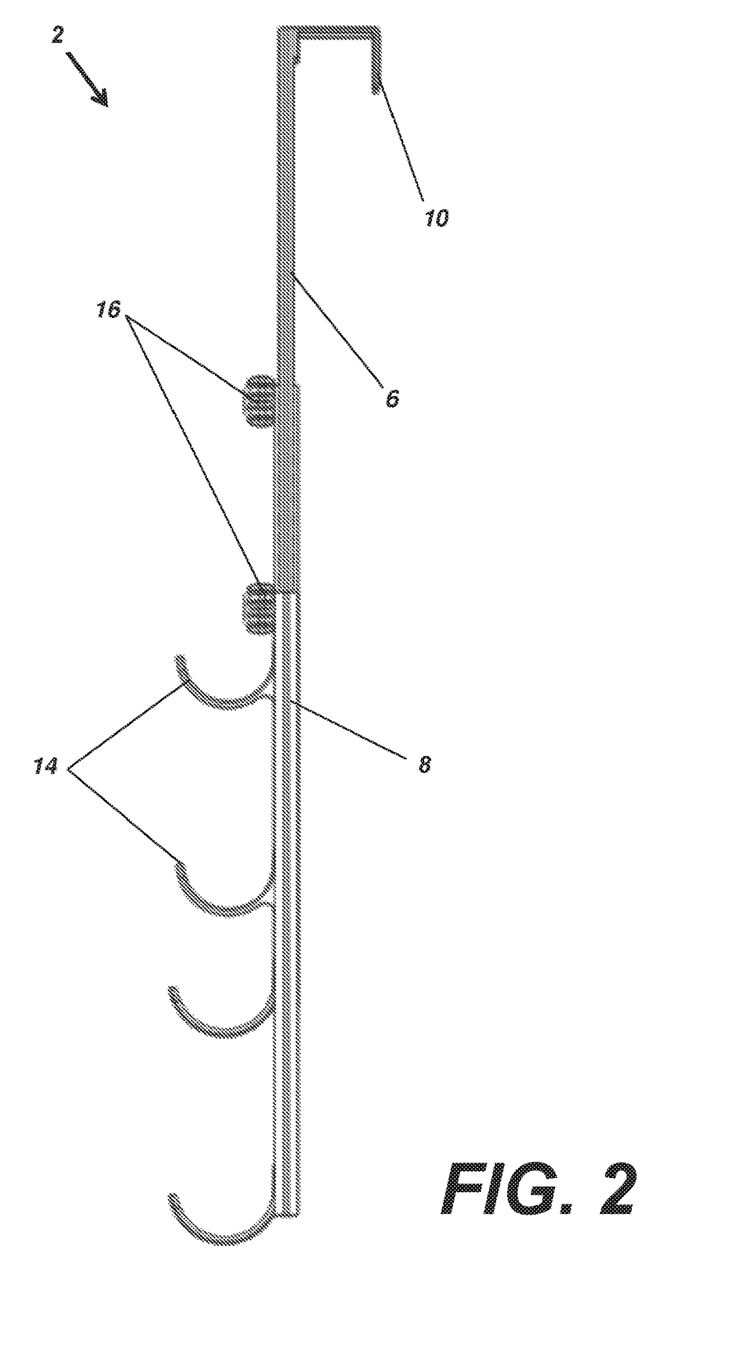
FIG. 2 is a side elevational view thereof.
Figure 3:
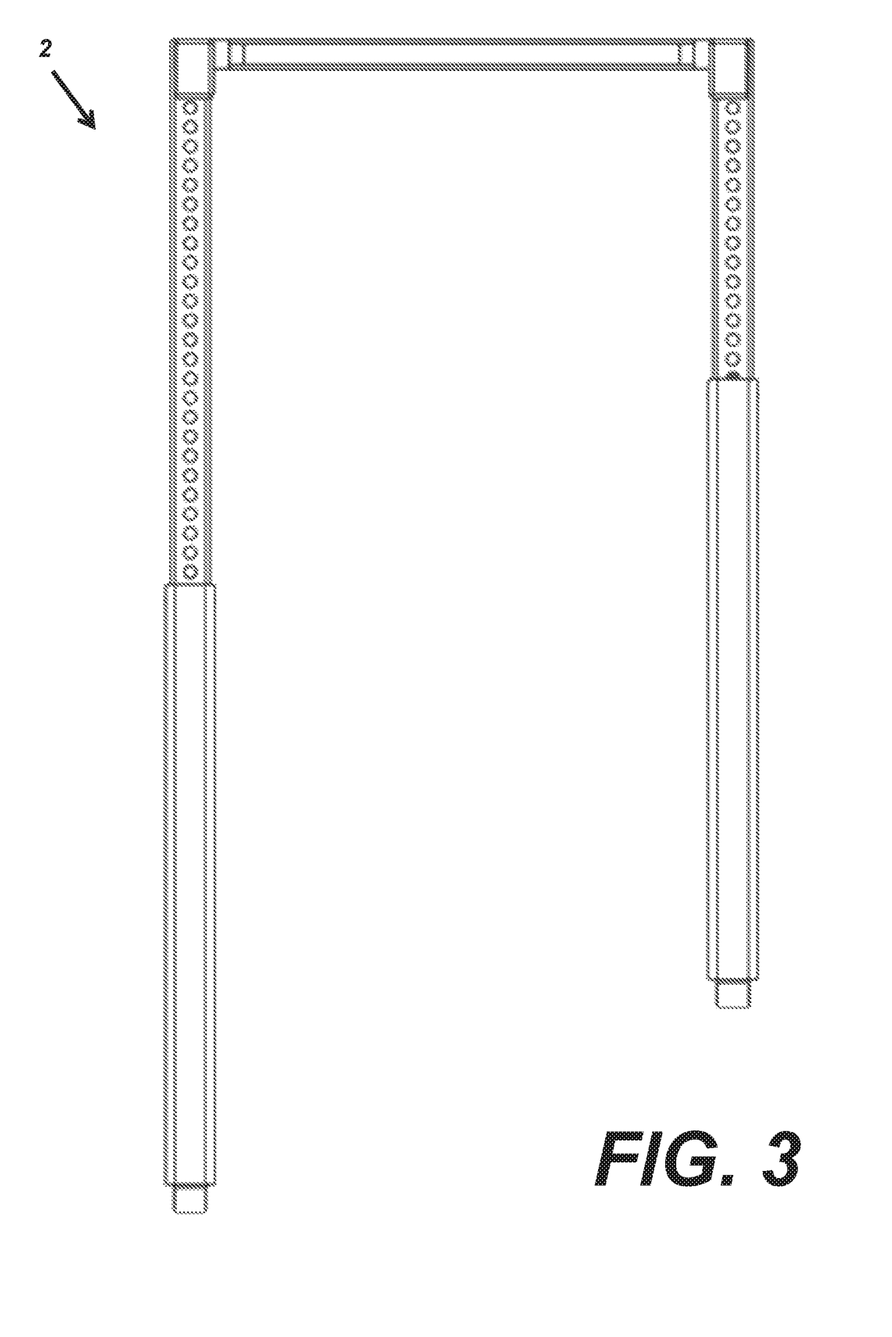
FIG. 3 is a rear elevational view thereof.
Figure 4:
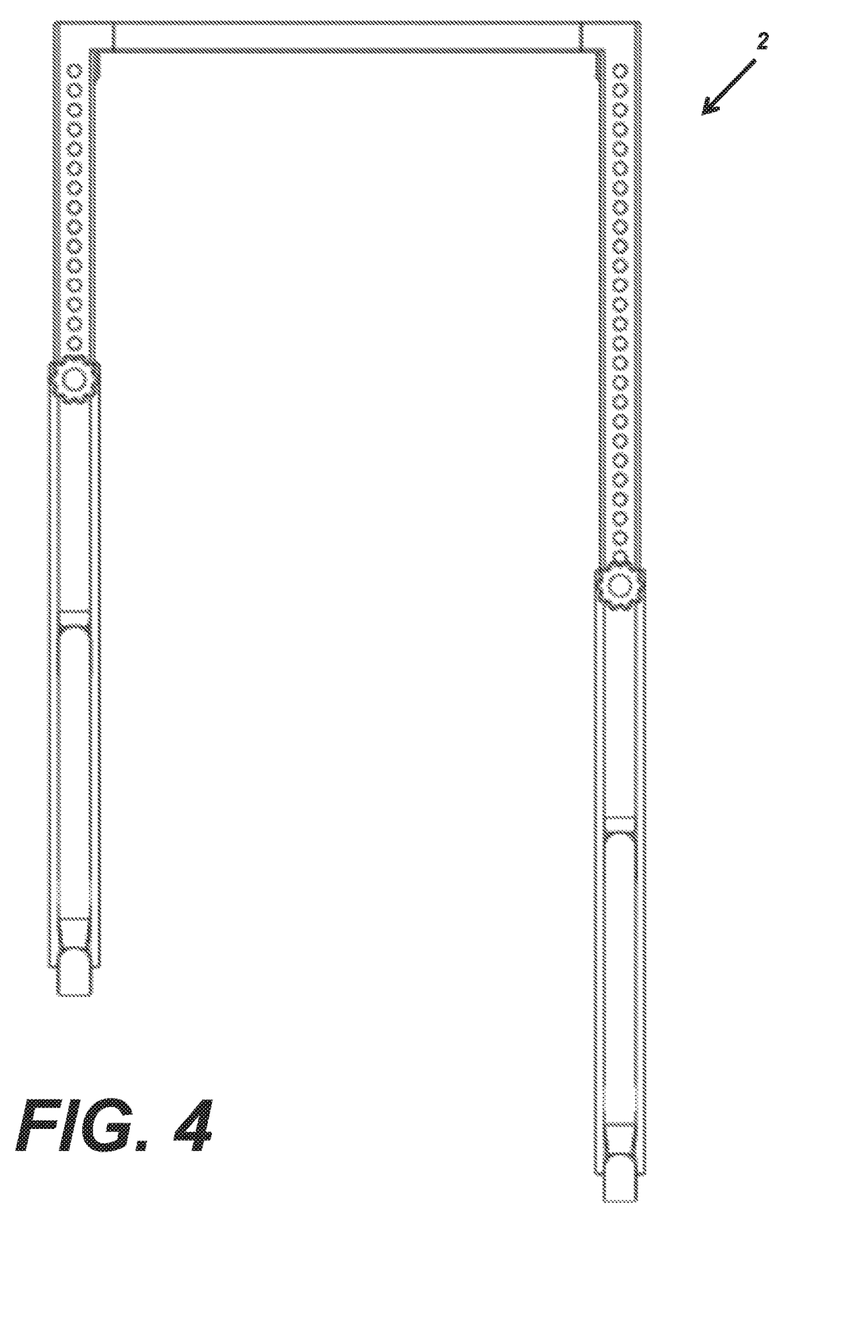
FIG. 4 is a front elevational view thereof.
Figure 5:
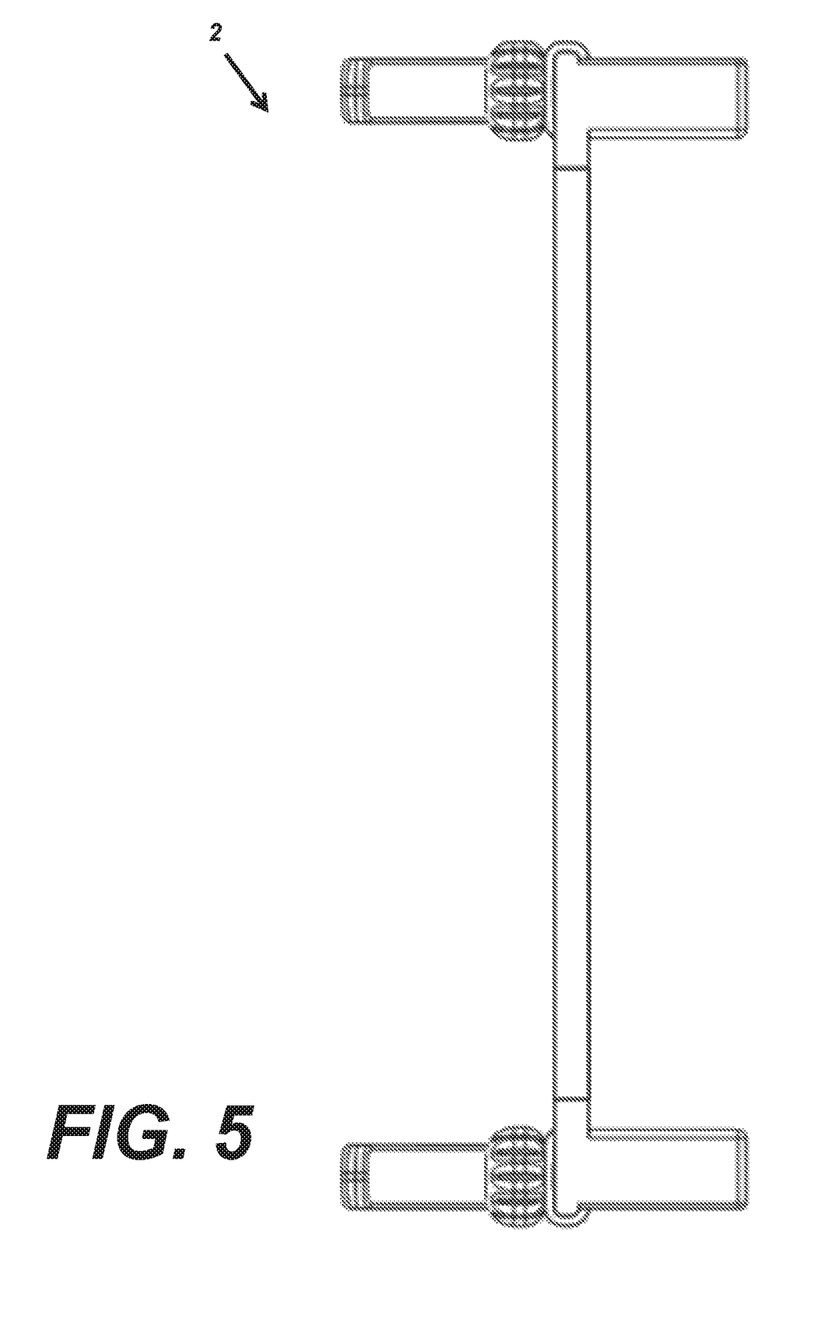
FIG. 5 is a top plan view thereof.
Figure 6:
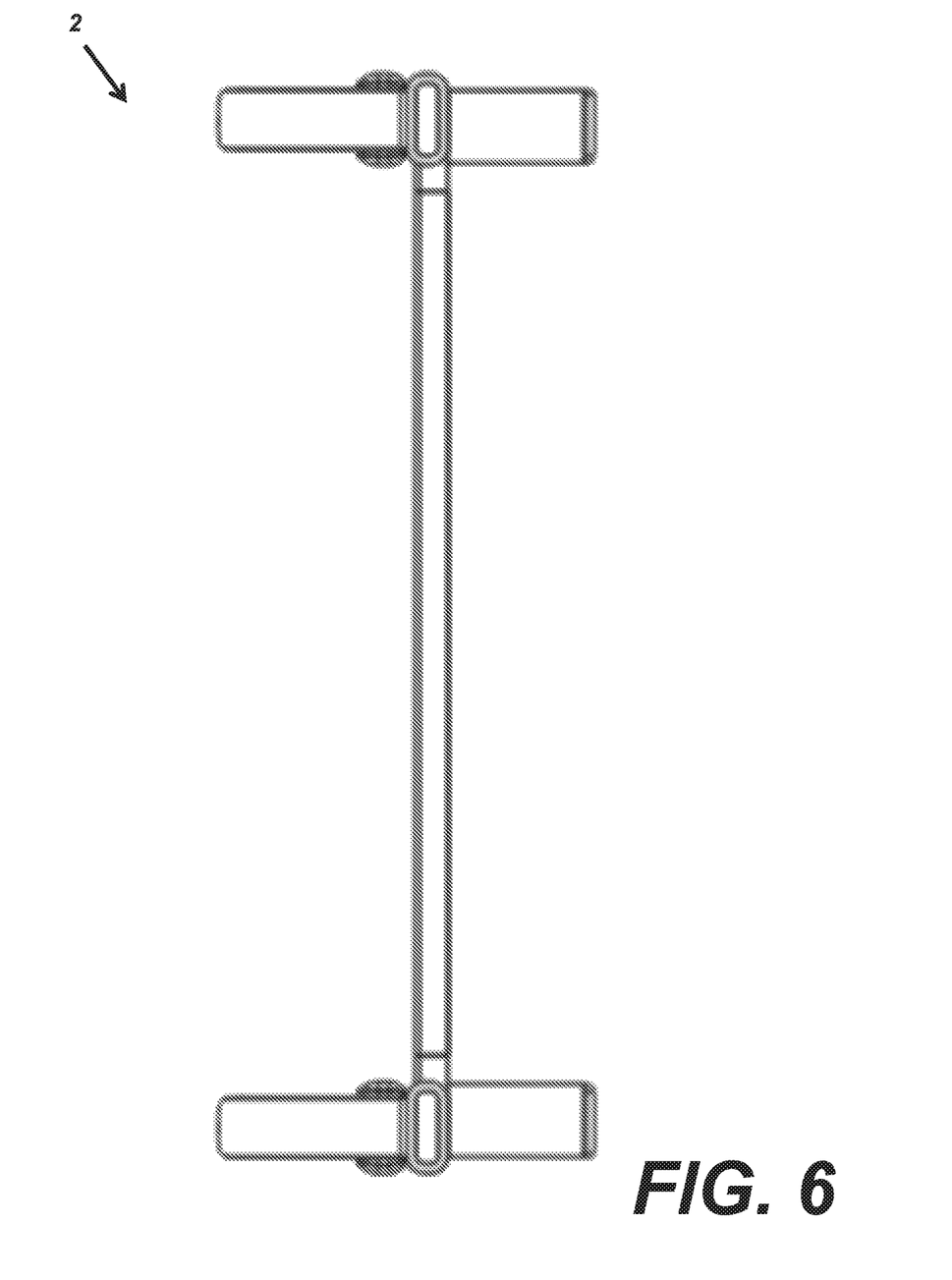
FIG. 6 is a bottom plan view thereof.
Figure 7:
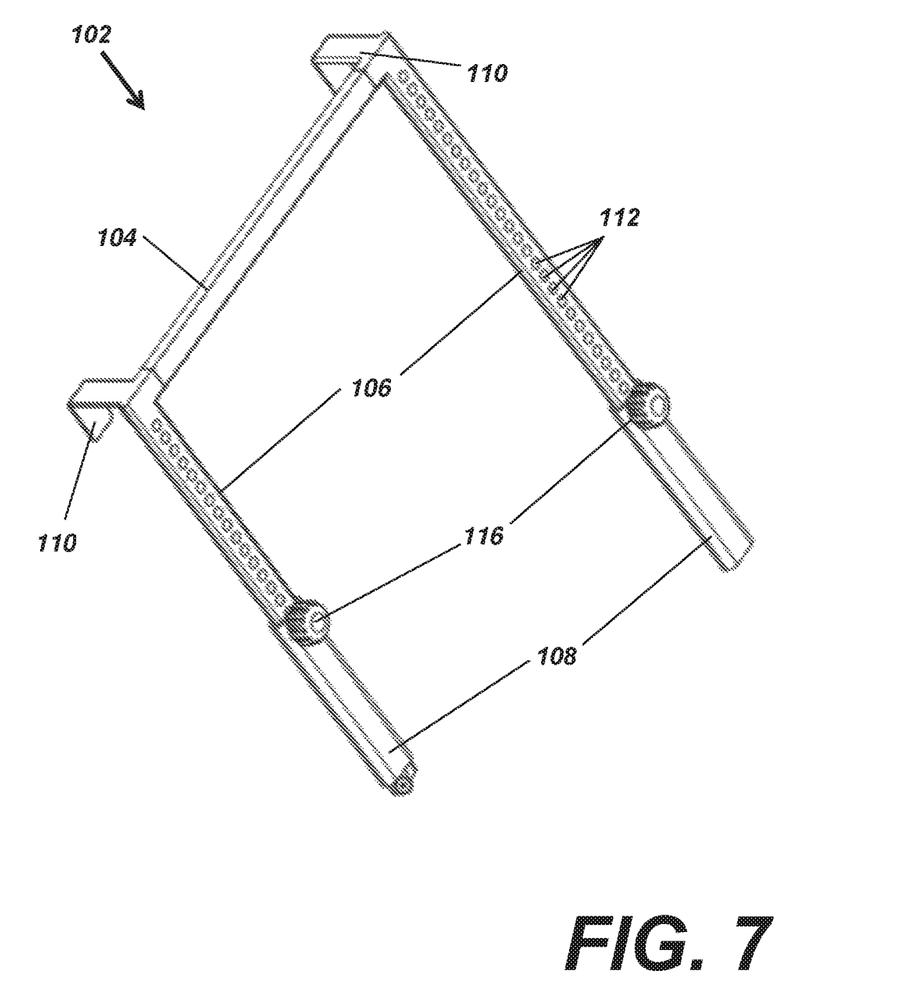
FIG. 7 is a three-dimensional isometric view of an alternative embodiment of the present invention about a top-left edge.
Figure 8:
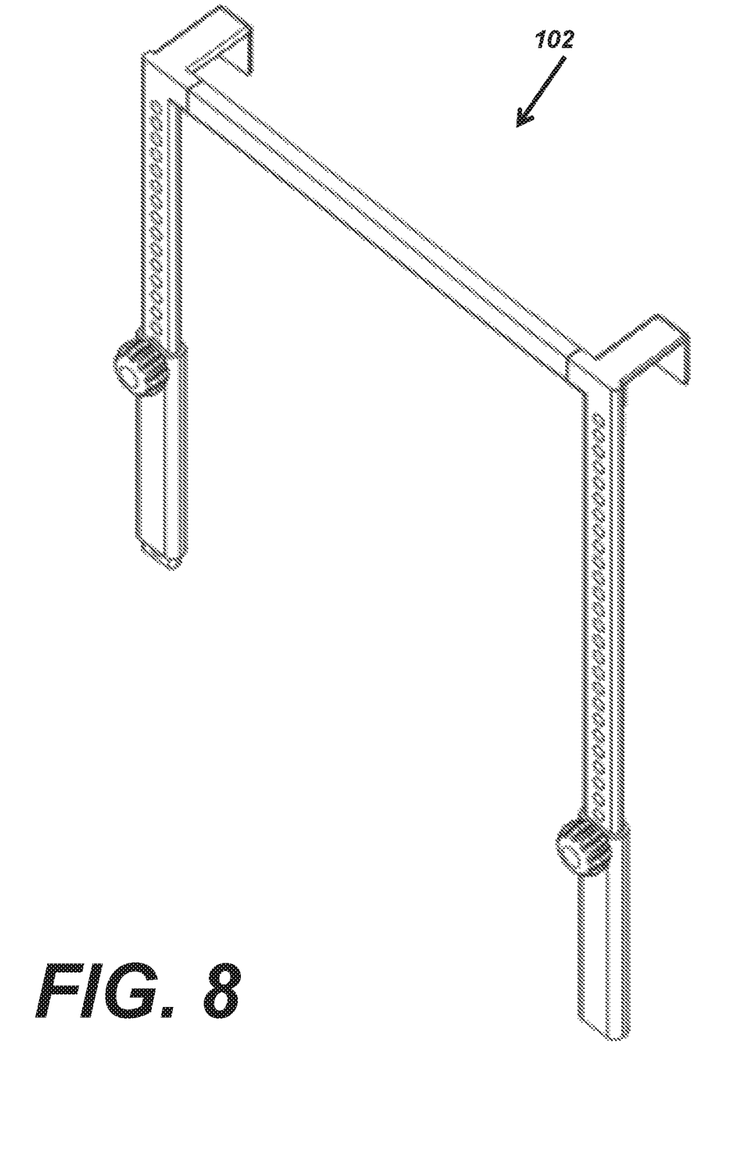
FIG. 8 is a three-dimensional isometric view thereof about a top-right edge.
Figure 9:
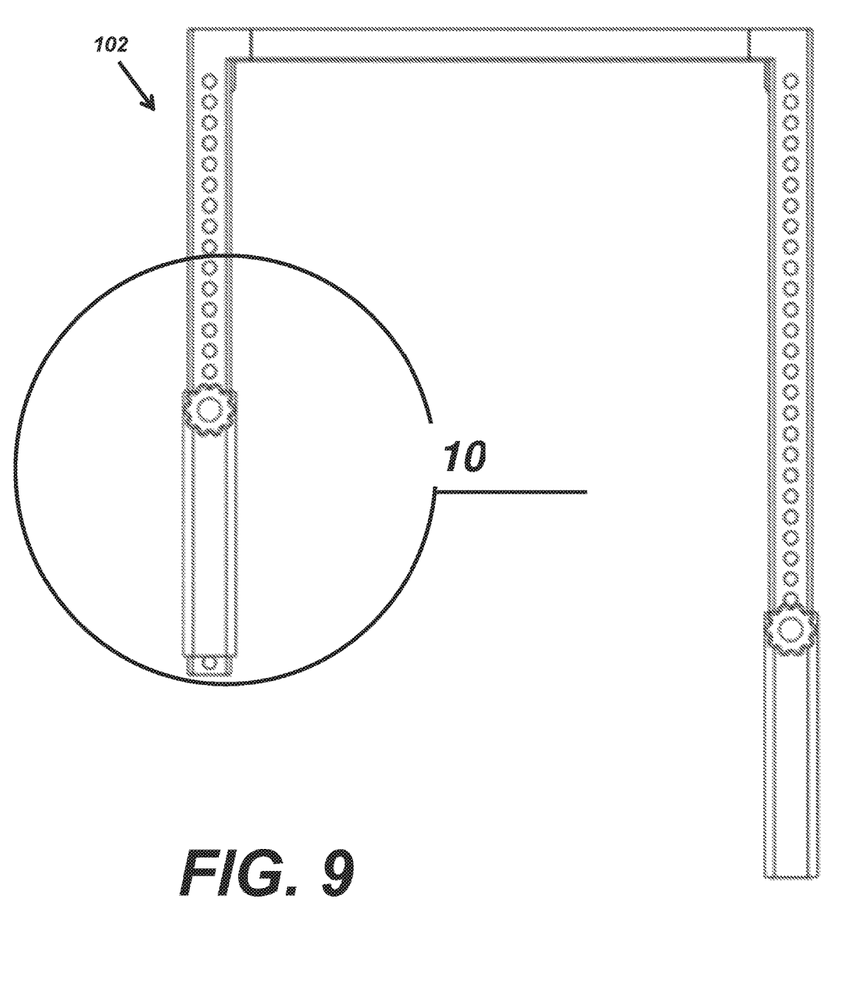
FIG. 9 is a front elevational view thereof.
Figure 10:
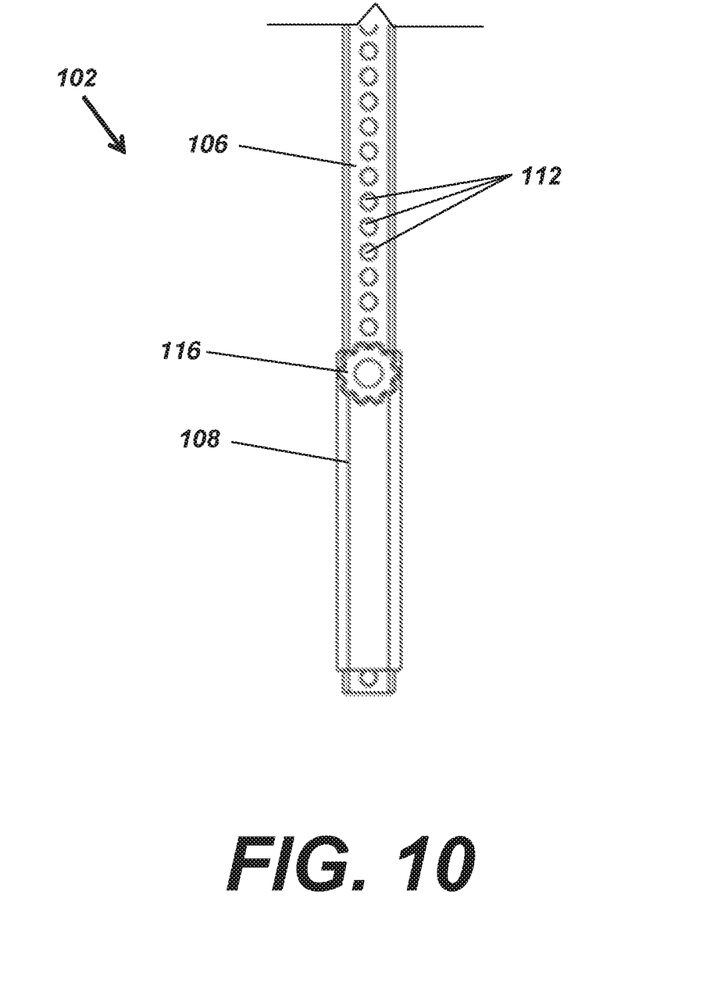
FIG. 10 is a detailed view taken about the circle of FIG. 9.
Figure 11:
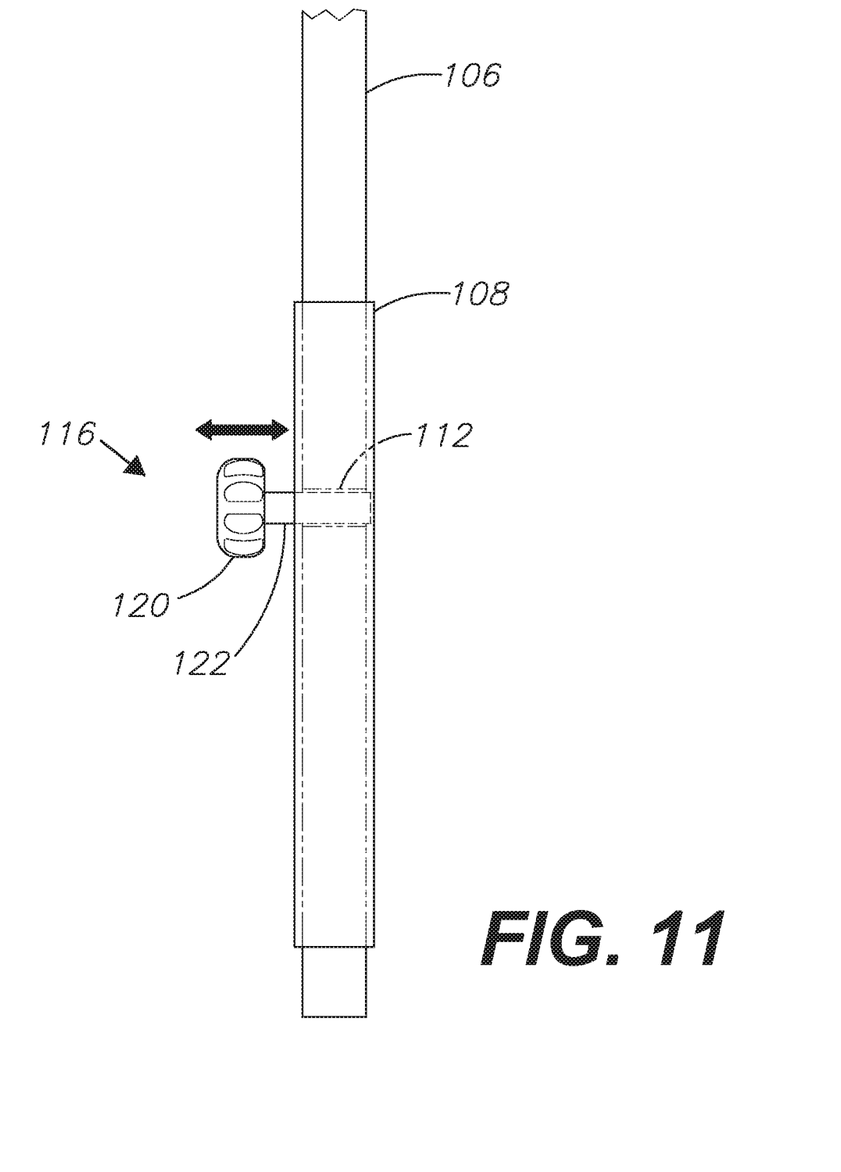
FIG. 11 is a side elevational view showing details of the present invention.

FIG. 11 shows how the grippable handle element 116, which includes the handle 120 and pin 122, can be drawn out and reinserted into a slot 112. A spring or some other element may be used to help retain the grippable handle 116 within the slide 108.

Figure 12:
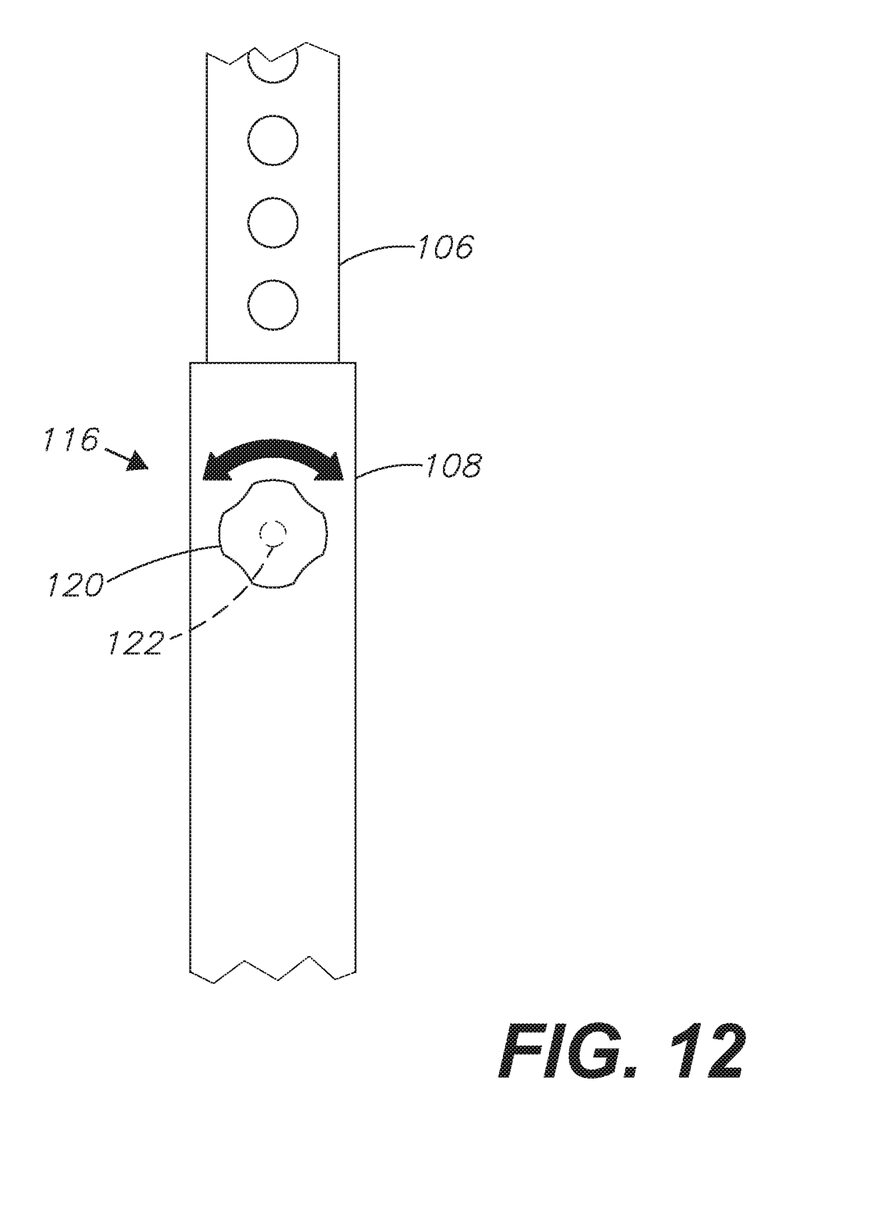
FIG. 12 is a front elevational view showing details of the present invention.

FIG. 12 shows the alternative where the pin 122 would have threads and could be twisted to be threaded or unthreaded into the slot 112.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. An adjustment management system for storage solutions, the system comprising:
    a flat hook configured for hanging above a door;
    a pair of vertically oriented arms, each of said arms comprising a plurality of slots;
    a pair of slides, each of said slides slideably engaged with a respective one of said arms;
    an adjustment element provided for each of the slides, each of said adjustment elements comprising a grip and a pin configured for selectively engaging a respective one of said slide with one of said plurality of slots;
    said grip of each of said adjustment elements comprising an ergonomic handle configured to be gripped and adjusted by hand;
    each of said slides further configured to provide storage solutions;
    at least one hook extending from an exterior face of each of said slides; and
    each of said pair of slides independently slideable from the other of said pair of slides such that each may be adjusted to a different height.

2. The adjustment management system of claim 1, wherein each of said adjustment elements comprises a spring element and is configured to be pulled out of a first one of said plurality of slots, and said spring element configured to automatically lock said adjustment element into a second one of said plurality of slots upon sliding said adjustment mechanism past said second one of said plurality of slots.

3. The adjustment management system of claim 1, further comprising:
    said plurality of slots each comprising threadable receivers; and
    said pin of said adjustment mechanism comprising threads for being received by said threadable receivers.

4. A storage management system comprising:
    a horizontal crossbar comprising a pair of flat hooks for engaging a top edge of a door, said horizontal crossbar having a first end and a second end;
    a first vertical arm extending down from said first end of said horizontal crossbar and a second vertical arm extending down from a second end of said horizontal crossbar, each of said first and second vertical arms comprising a plurality of slots;
    a pair of slides each slideably engaged with a respective one of said first and second vertical arms;
    each of said pair of slides comprising an adjustment element;
    configured for selectively engaging said slide with one of said plurality of slots;
    each of said pair of slides independently slideable from the other of said pair of slides such that each may be adjusted to a different height; and
    said slide further configured to provide storage solutions.

5. The storage management system of claim 4, further comprising:
    each said adjustment element comprising a grip and a pin, said grip comprising an ergonomic handle configured to be gripped and adjusted by hand.

6. The storage management system of claim 5, wherein said adjustment element comprises a spring element and is configured to be pulled out of a first one of said plurality of slots, and said spring element configured to automatically lock said adjustment element into a second one of said plurality of slots upon sliding said adjustment mechanism past said second one of said plurality of slots.

7. The storage management system of claim 5, further comprising:
    said plurality of slots each comprising threadable receivers; and
    said pin of said adjustment mechanism comprising threads for being received by said threadable receivers.

8. A method of adjusting a storage management system, the method comprising the steps:
    engaging a pair of flat hooks of a horizontal crossbar with a top edge of a door, said horizontal crossbar comprising first end and a second end, and further comprising a first vertical arm extending from said first end and a second vertical arm extending from said second end, each of said first and second vertical arms further comprising a plurality of slots;
    slidably engaging a first slide with said first vertical arm and a second slide with said second vertical arm;
    slotting a first adjustment element into a first one of said plurality of slots of said first arm thereby temporarily locking said first slide into place along said first arm;
    slotting a second adjustment element into a first one of said plurality of slots of said second arm thereby temporarily locking said second slide into place along said second arm;
    selectively disengaging said first adjustment element from said first one of said plurality of slots;
    sliding said first slide along said first vertical arm, such that said first adjustment element and said second adjustment element are at different heights along their respective vertical arms; and
    selectively engaging said first adjustment element with a second one of said plurality of slots.

9. The method of claim 8, further comprising the step:
    wherein each said adjustment element comprising a grip and a pin.

10. The method of claim 8, further comprising the step:
    pulling out of a first one of said plurality of slots, wherein said adjustment element comprises a spring element; and automatically locking said adjustment element into a second one of said plurality of slots with said spring element upon sliding said adjustment mechanism past said second one of said plurality of slots.

11. The method of claim 8, further comprising the steps:

wherein said plurality of slots each comprising threadable receivers; and wherein said pin of said adjustment mechanism comprising threads for being received by said threadable receivers.

* * * * *